United States Patent Office.

BENJAMIN SADTLER, OF DENVER, COLORADO, ASSIGNOR TO ALBERT G. CLARK, OF CINCINNATI, OHIO.

RETORT FOR TREATING ORES.

SPECIFICATION forming part of Letters Patent No. 652,332, dated June 26, 1900.

Application filed July 13, 1899. Serial No. 723,700. (No model.)

*To all whom it may concern:*

Be it known that I, BENJAMIN SADTLER, of the city of Denver, county of Arapahoe, State of Colorado, have invented a certain new and useful Improvement in Retorts for Treating Ores and Analogous Purposes, of which the following is a specification.

The object of my invention is to provide a composite retort capable of resisting the heat to which it is subjected in use and at the same time adapted to resist the destructive actions of ores containing a substantial quantity of iron oxid or other ingredients which act upon or corrode ordinary fire-clay retorts, while so forming the retort that it shall constitute a practically-solid body throughout its entire thickness as distinguished from a retort composed of an outer wall of one material having applied thereto a lining of different material united by merely mechanical adhesion. If a lining of basic or other material united to the outer body by ordinary mechanical adhesion were depended upon for the reduction of ores, the brittle lining would, by abrasion and other causes, be almost immediately broken or peeled off or cracked, so as to expose the body to the destructive action of the iron oxids or other chemical agents which dissolve or corrode ordinary retorts. I have discovered that by forming the body of the retort of an admixture of fire-clay or equivalent refractory material possessing the necessary binding qualities and of burnt dolomite, calcined magnesite, or other infusible basic material, using such base in chemical excess (preferably considerably increasing that excess toward the interior surface which is to be protected) and subjecting this composite retort to treatment in a kiln where it is heated to about 1,500° Fahrenheit, preferably for two or three days, at least, before introducing the ores to be distilled, I can form a retort which is practically solid and continuous throughout, which while combining the properties of the fire-clay and the base exposes no seams or joints to chemical reactions and avoids the objections incident to applying an inner wall of one material to a distinct outer wall, which readily transmits heat, and which has sufficient strength, combined with sufficient resistance to the corrosive action of basic ores, to be successfully used in distilling ores containing a large percentage of iron oxid or other corroding agents. Basic materials having little or no chemical affinity for water are preferable. The fire-clay should be mixed with the base before being dried or burned and the composite mass molded into solid retorts, which should be dried after being thus molded; but the fire-clay or refractory ingredients must not be burned until the composite structure is fired immediately before use, it being understood that with these retorts, as with the ordinary fire-clay retorts, their utility for distilling under high temperatures would be destroyed if the fire-clay components were allowed to cool after being fired and that when placed in the furnace and fired they must not be permitted to cool, but must remain in the furnace continuously at high temperature during the period of their use. While it is desirable to have the basic material in excess throughout the body of the retort in order to prevent fusion under high temperatures, a larger excess is required at and near the inner surface than toward the outside. A large excess is also desirable on the outer top wall of the retort, so as to resist the action of the contents of the retorts above if by reason of breakage or other cause these contents come in contact with it. The temperature and time of treatment in the kiln may be somewhat varied from what I have here suggested; but there should be a thorough firing in the kiln or zinc furnace after the ingredients are mixed and after the retort thus composed is given its proper form before it is charged.

In order to be treated as an equivalent of fire-clay for the purposes of this invention, the acid material must possess the adherence and binding qualities, as well as the refractory qualities, which are present in fire-clay. The firing serves to frit together the fire-clay body and the basic material into a solid cohering body.

I claim—

1. A retort composed of an admixture of fire-clay serving as a binding material, and of infusible basic material in excess at the inner surface, the whole fritted together, substantially as and for the purpose described.

2. A retort for distillation of metallic ores, composed of an admixture of fire-clay and infusible basic material in excess, such excess increasing toward the inner surface, the whole fritted together, substantially as and for the purpose described.

BENJAMIN SADTLER.

Witnesses:
    ALBERT G. CLARK,
    M. SINCLAIR.